(12) United States Patent
Liu et al.

(10) Patent No.: US 7,425,710 B2
(45) Date of Patent: Sep. 16, 2008

(54) ANODE LAYER PARTICLE BEAM DEVICE

(75) Inventors: Ping-Chun Liu, Zhubei (TW); Ming-Te Hsiung, Zhunan Town (TW); Ming-Hsin Liu, Hsinchu (TW); Tean-Mu Shen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 585 days.

(21) Appl. No.: 11/144,677

(22) Filed: Jun. 6, 2005

(65) Prior Publication Data
US 2006/0138342 A1    Jun. 29, 2006

(30) Foreign Application Priority Data
Dec. 24, 2004    (TW) ............................... 93140455 A

(51) Int. Cl.
*H01J 27/02* (2006.01)
(52) U.S. Cl. ............................... 250/423 F; 313/111.91
(58) Field of Classification Search ............... 250/423 F
See application file for complete search history.

(56) References Cited

U.S. PATENT DOCUMENTS

| 6,456,011 B1* | 9/2002 | Bugrova et al. ........ 315/111.91 |
| 6,919,690 B2* | 7/2005 | Siegfried et al. ....... 315/111.91 |
| 7,183,559 B2* | 2/2007 | Luten et al. ............. 250/423 R |

* cited by examiner

*Primary Examiner*—David A. Vanore
*Assistant Examiner*—Phillip A. Johnston

(57) ABSTRACT

An anode layer particle beam device includes a base, at least an anode placed on top of the base, an insulation layer set between the anode and the base, at least one magnetic pole, made of magnetic and conductive material and can be used as a cathode, an electric discharge channel, positioned between the anode and the magnetic pole, and an insulating material, placed in the electric discharge channel to serve as an insulator between the anode and the magnetic pole. The magnetic pole is positioned on top of the base and on an somewhat elevated outer periphery of the aforementioned anode (with the center of the later also as its center). An orifice is also set on the radiation path of the anode. Accordingly, a process gas stream can be directed into the electric discharge channel and, after being applied with a biased electric field, with the aide of the anode and the magnetic pole device, a particle beam can be generated and radiated out of the channel.

17 Claims, 7 Drawing Sheets

ANODE LAYER PARTICLE BEAM DEVICE

BACKGROUND OF THE INVENTION

1. Field of the Invention

The present invention relates to an anode layer particle beam device, and particularly to a device that can prevent damages caused by particles depositing on the surface of the anode and magnetic poles inside components thereof.

2. Description of Related Art

Traditionally, the most common technique of LC (Liquid Crystal) alignment is done by unidirectional rubbing of aligning films deposited at the bounding substrates. This method has several drawbacks. The rubbing process not only causes surface deterioration, but generates electrostatic charges and dust on the aligning surfaces.

The technique of using anode layer particle beam source in plasma beam alignment (of liquid crystals) originates from former Soviet Union's satellite propulsion technology. U.S. Pat. Nos. 6,238,526 and 6,037,717 both disclose technologies related to the application of the anode layer particle beam source in liquid crystal alignment.

The anode layer particle beam source device uses a DC plasma system to produce a plasma source, and, by making use of the strong positive bias electric field created by its positive electrode, force the ions in the plasma into action, thereby producing an anode layer that can be used in various manufacturing processes of semi-conductors.

The plasma beam alignment method is to use the ion source of the plasma thruster's anode layer to produce very straight and accurate plasma beam to treat the bounding substrates of liquid crystals cells for alignment. The aligning film treated by the plasma beam method not only is free from electrostatic charges and miniscule dust particles, but has the characteristics of photo stability, homogeneous alignment, adjustable pre- tilted angle, the ability to generate alignment with desirable parameters and to pattern LC cells and plasma beam alignment, effectively upgrading the quality of the aligning film.

However, there are still several drawbacks that are inherent with the conventional structures as described above.

1. The operation of conventional anode layer particle beam source devices involve applying high voltage electric charge between the anode and the cathode to ionize a gas to produce plasma, which often bring about arc radiations that may easily cause damage to a device's internal components such as the anode and the magnetic poles, significantly shortening the device's service life.

2. The conventional structures as described above are susceptible to particle deposition, caused by plasma generated inside the device during operation, which in the long run will damage such components as the anode and the magnetic poles.

In view of the drawbacks of the above prior art anode layer particle beam source devices, the inventor has, based on his many years of R&D experience in related industries, invented an improved type of anode layer particle beam source device.

SUMMARY OF THE INVENTION

This invention, therefore, is to provide an improved type of anode layer particle beam source device. The method is to place an insulating material between the anode and the magnetic pole so that only the particle beam path area opposite the aligning film is exposed, limiting plasma generation to only the area, which will prevent the internal components of the device from deterioration, prolonging their service life and lowering maintenance cost.

Accordingly, the anode layer particle beam source device includes a base, at least an anode, a base, a magnetic pole, an orifice, an electric discharge channel and an insulating material. The anode is made of metal material and placed on top of the base with an insulation layer placed between the anode and the base. The magnetic pole is made of magnetic and conductive material and can be used as a cathode. The magnetic pole is positioned on top of the base and on an somewhat elevated outer periphery of the aforementioned anode (with the center of the later also as its center). The orifice is also set on the radiation path of the anode. The electric discharge channel is positioned between the anode and the magnetic pole. The insulating material is placed in the electric discharge channel to serve as an insulator between the anode and the magnetic pole. With the above-described devices, a process gas stream can be directed into the electric discharge channel and, after being applied with a biased electric field, with the aide of the anode and the magnetic pole device, a particle beam can be generated and radiated out of the channel.

BRIEF DESCRIPTION OF THE DRAWINGS

The following drawings illustrate a few representative embodiments of the present invention and may serve to exemplify the various advantages and objects of the invention, Please understand that they are presented for illustration purpose only and, thus, should not be construed as limitative of the present invention.

DETAILED DESCRIPTION OF THE PREFERRED EMBODIMENT

Figure 1:
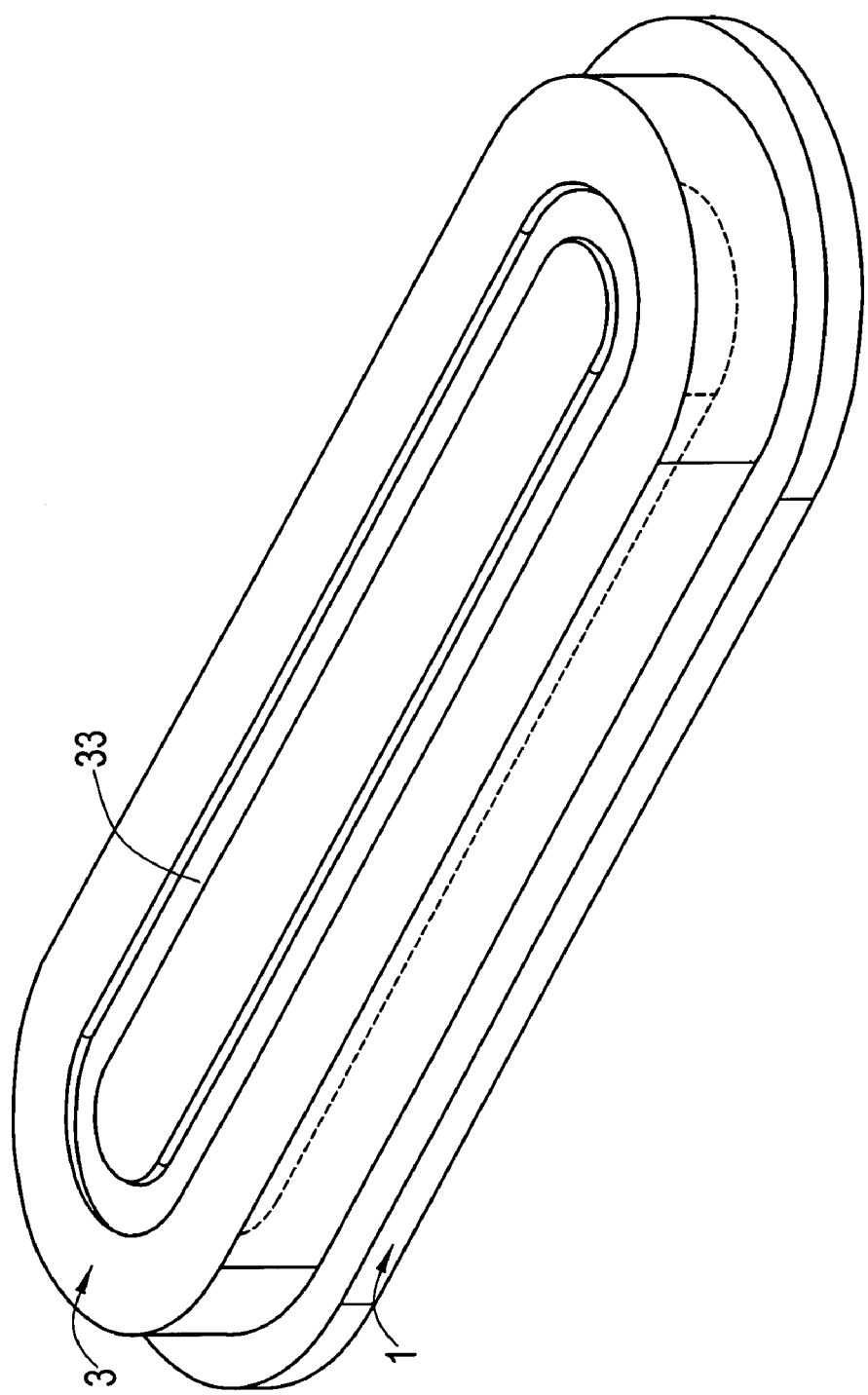
FIG. 1 is a perspective view of a representative embodiment of the present invention.
Figure 2:
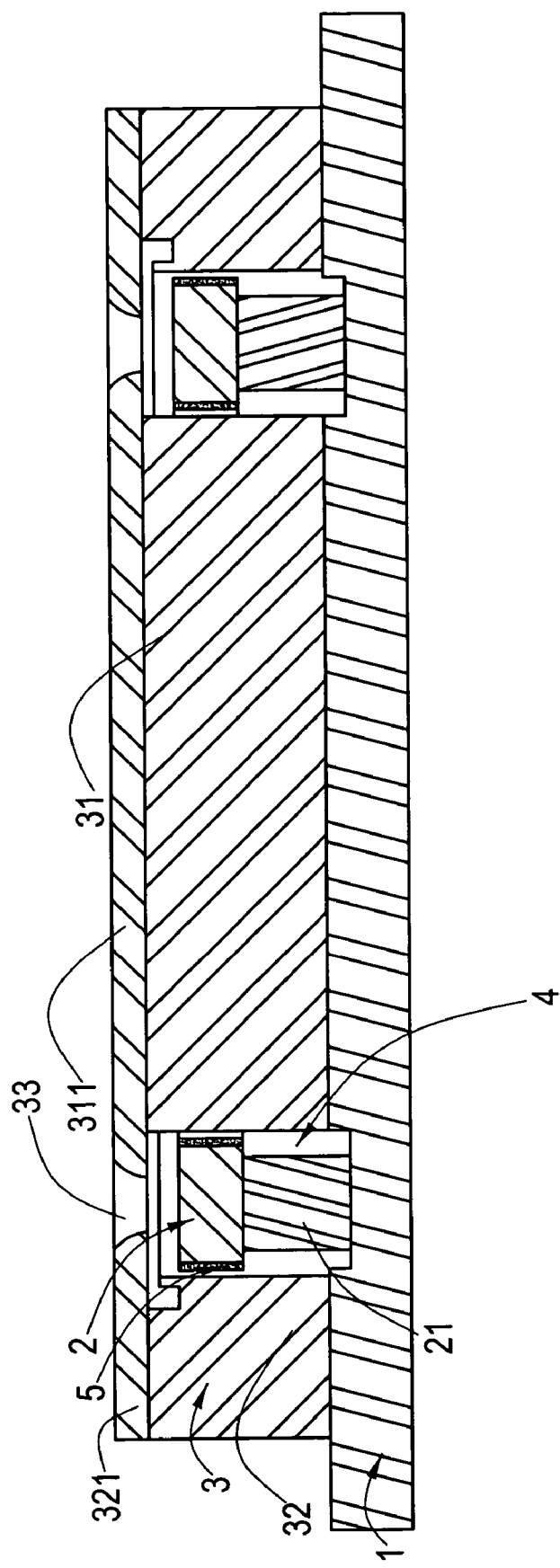
FIG. 2 is a cross sectional view of the above embodiment of the present invention.

To enable the examiners to better understand the structure, operation, and features of the present invention, the inventor will further give a detailed description in the following of a preferred embodiment of the invention, with the aid of the illustrations given in the above:

As shown in FIG. 1 and FIG. 2, the present invention comprises a base 1, at least an anode 2, at least a magnetic pole, an electric discharge channel 4, and an insulation material 5.

The base 1 is an oval shaped object made of metallic material. The anode 2 can be a continuous circle made of metallic material, and is positioned on top of the base 1, with an insulation layer 21 placed between the anode 2 and the base 1.

The magnetic pole 3 is positioned on top of the base 1 and on a somewhat elevated outer periphery of the aforementioned anode with the center of the later also as its center.

Also, the magnetic pole 3 comprises two ovals, built on the base 1 and having the same center but with different radiuses, with one oval being the inner wall 31 and another being the outer wall 32, each on one side of the anode 2. On top of the inner wall 31 is the inner ceiling 311, while on top of the outer wall 32 is the outer ceiling 321 that corresponds to the inner ceiling 311. Both the outer wall 32 and the outer ceiling 321 are made of magnetic and conductive parts and can be used as a cathode. Furthermore, somewhere on the radiation path of the anode 2 and also between the inner ceiling 311 and the outer ceiling 321, at least an orifice 33 is formed for the particle beam to radiate out.

The electric discharge channel 4 is formed among the magnetic pole 3, the inner wall 31, the outer wall 32, and the anode 2.

The insulation material, placed in the electric discharge channel 4, and also coated on the outer surface of the anode 2, is made of Teflon and is used to insulate the anode 2 from the magnetic pole 3.

When the structure as described above is in operation, as shown FIG. 1 and FIG. 2, a process gas stream can then be directed into the electric discharge channel, and after being applied with a biased electric field, with the aide of the anode 2 and the magnetic pole device 3, a particle beam can be generated and radiated out of the orifice 33 to the targeted aligning film to perform intended surface treatment jobs. Via the shield of the Teflon insulation material 5 coated on the outer surface of the anode 2, the plasma caused by high voltage electric charge being applied between the anode and the cathode to ionize the gas during the operation can be constricted, preventing such effects as arc radiations and particle deposition, which may easily cause damage to the device's internal components such as the anode and the magnetic poles, from happening.

In the second embodiment of the present invention, the insulation material 5 in the structure as described above, can be made of ceramic material, and be coated on the outer surface of the anode 2.

Figure 3:
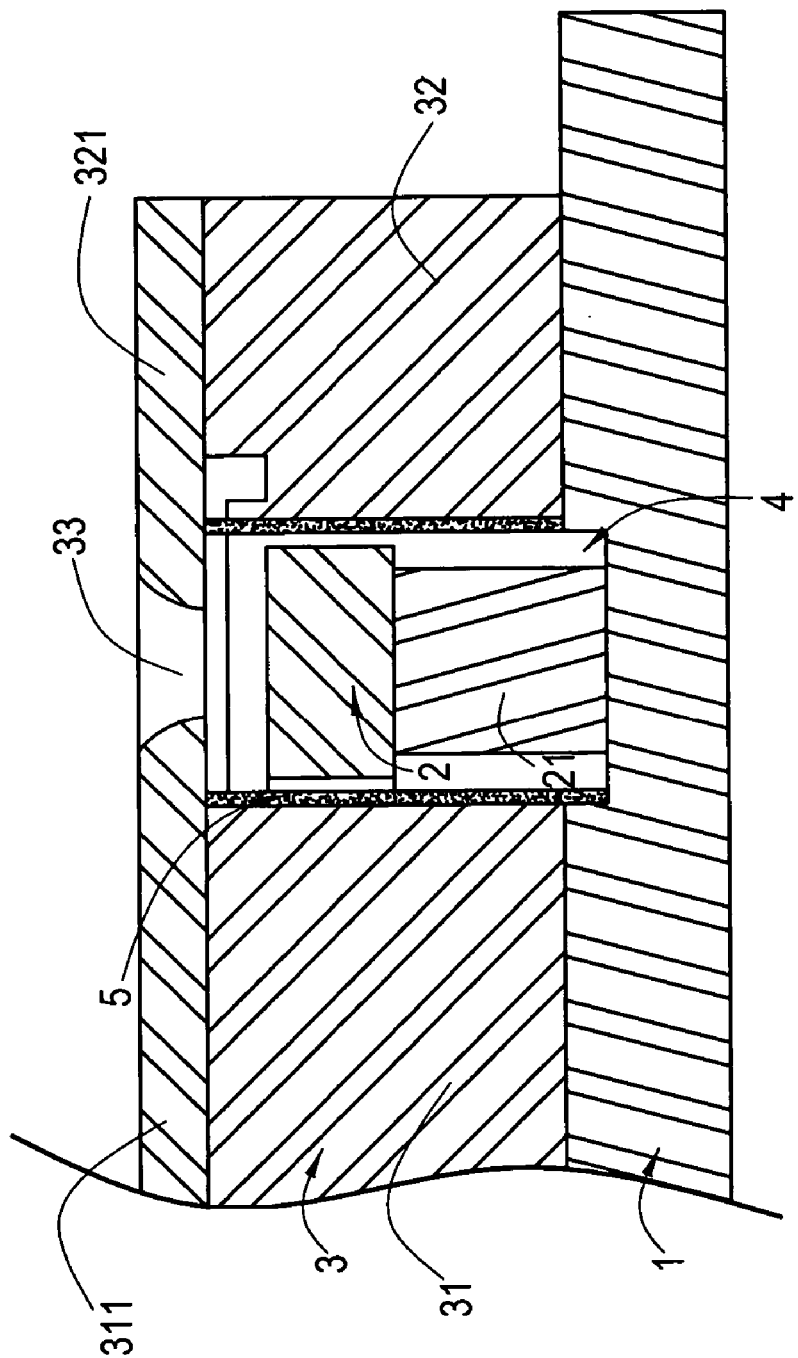
FIG. 3 shows how a third embodiment of the present invention works.

In the third embodiment of the present invention, as shown in FIG. 3, the insulation material 5 of the structure as described above, may be coated on the inner end surfaces of the inner wall 31 and the outer wall 32 of the magnetic pole 3.

With the structure as described above, via the shield of the Teflon insulation material 5 coated on the inner end surfaces of the inner wall 31 and the outer wall 32 of the magnetic pole 3, the plasma caused by high voltage electric charge being applied between the anode and the cathode to ionize the gas during the operation can be constricted, preventing such effects as arc radiations and particle deposition, which may easily cause damage to the device's internal components such as the anode and the magnetic poles, from happening.

Figure 4:
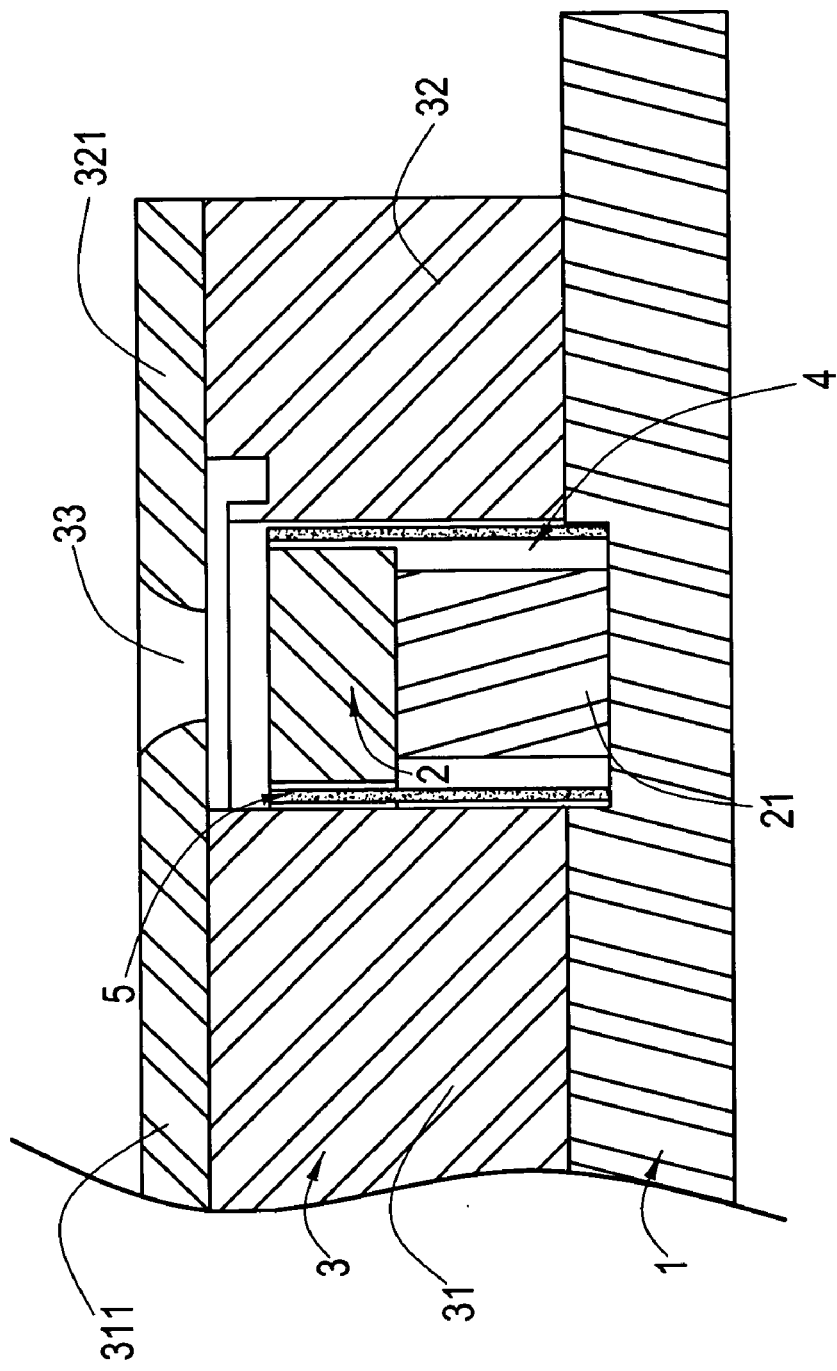
FIG. 4 shows how a fourth embodiment of the present invention works.

In the fourth embodiment of the present invention, as shown in FIG. 4, the insulation material 5 in the structure as described above may be a shield/shelter made of Teflon material. The function of the insulation material 5 is to shield the electric discharge channel 4, which is positioned between the anode 3 and the magnetic pole 3, serving as an insulator between the two.

With the structure as described above, via the shield of the insulation material between the anode 2 and the magnetic pole 3, the plasma caused by high voltage electric charge being applied between the anode and the cathode to ionize the gas during the operation can be constricted, preventing such effects as arc radiations and particle deposition, which may easily cause damage to the device's internal components such as the anode and the magnetic poles, from happening.

Figure 5:
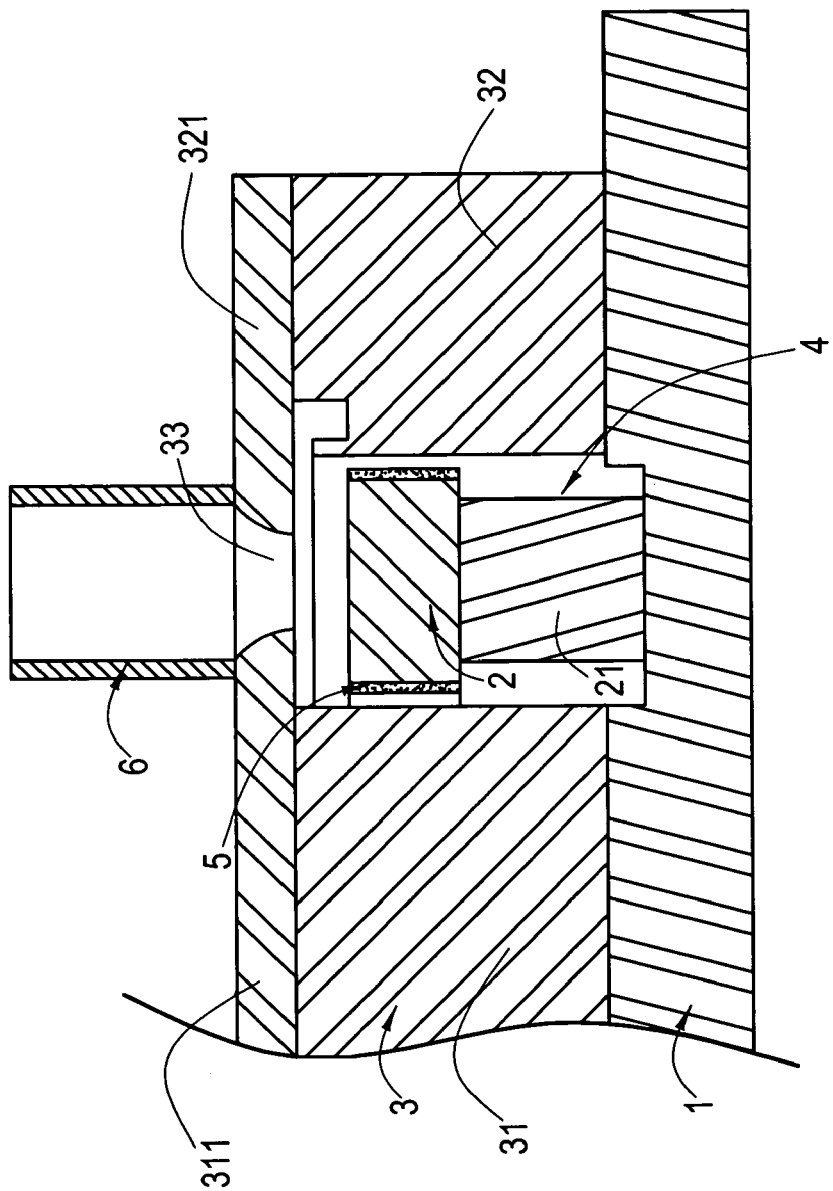
FIG. 5 shows how a fifth embodiment of the present invention works.

In the fifth embodiment of the present invention, as shown in FIG. 5, above the orifice 33 and around the radiation path of the anode 2 in the structure as described above, there is a constrictor 6 made of reflective material.

With the structure as described above, when a process gas stream is directed into the electric discharge channel and applied with a biased electric field, with the aide of the anode 2 and the magnetic pole device 3, a particle beam can be generated and radiated out of the orifice 33 to perform intended surface treatment jobs. The angle of the radiating particle beam can thus be maintained and be directed to the targeted aligning film without sputtering around, causing damage to components around the radiation path.

Figure 6:
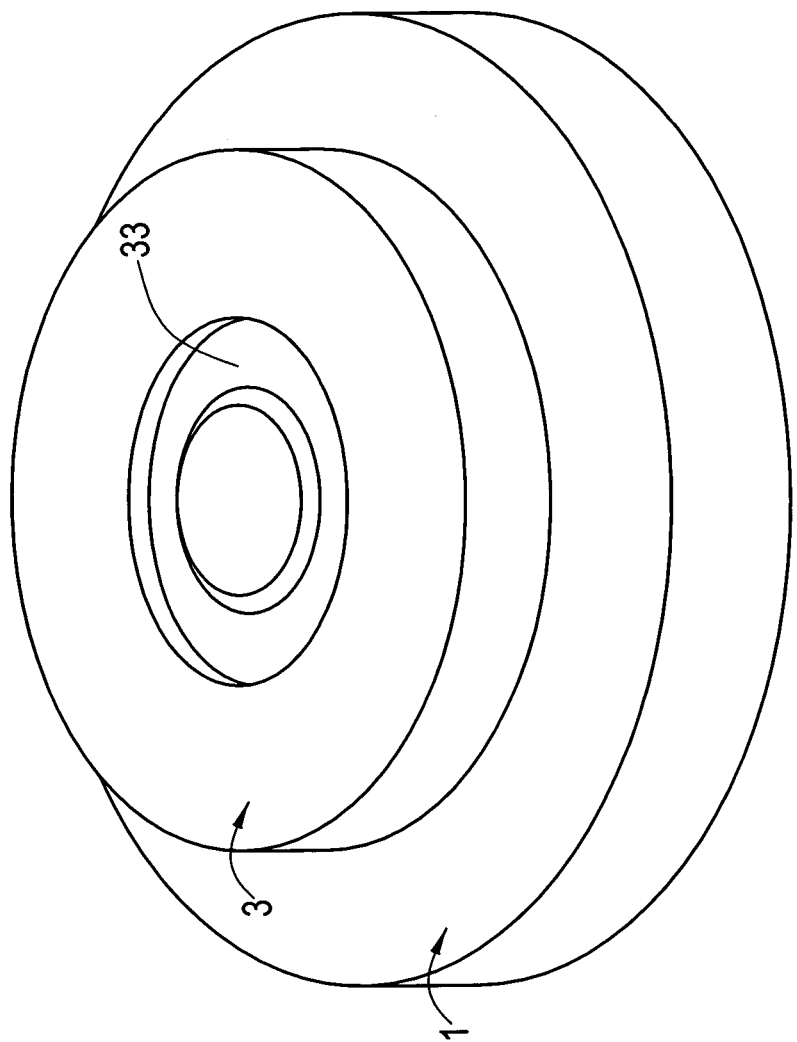
FIG. 6 shows how a sixth embodiment of the present invention works.

In the sixth embodiment of the present invention, as shown in FIG. 2 and FIG. 6, the base 1 may be a circular shaped object, with the magnetic pole 3 positioned on its top and on a somewhat elevated periphery of the anode 2, surrounding the center of the anode 2. Also, the magnetic pole 3 comprises two ovals, built on the base 1 and having the same center but with different radiuses, with one oval being the inner wall 31 and another being the outer wall 32 each on one side of the anode 2; on top of the inner wall 31 is the inner ceiling 311, while on top of the outer wall 32 is the outer ceiling 321 that corresponds to the inner ceiling 311; both the outer wall 32 and the outer ceiling 321 are made of magnetic and conductive parts and can be used as a cathode; furthermore, somewhere on the radiation path of the anode 2 and also between the inner ceiling 311 and the outer ceiling 321, at least an orifice 33 is formed for the particle beam to radiate out.

Figure 7:
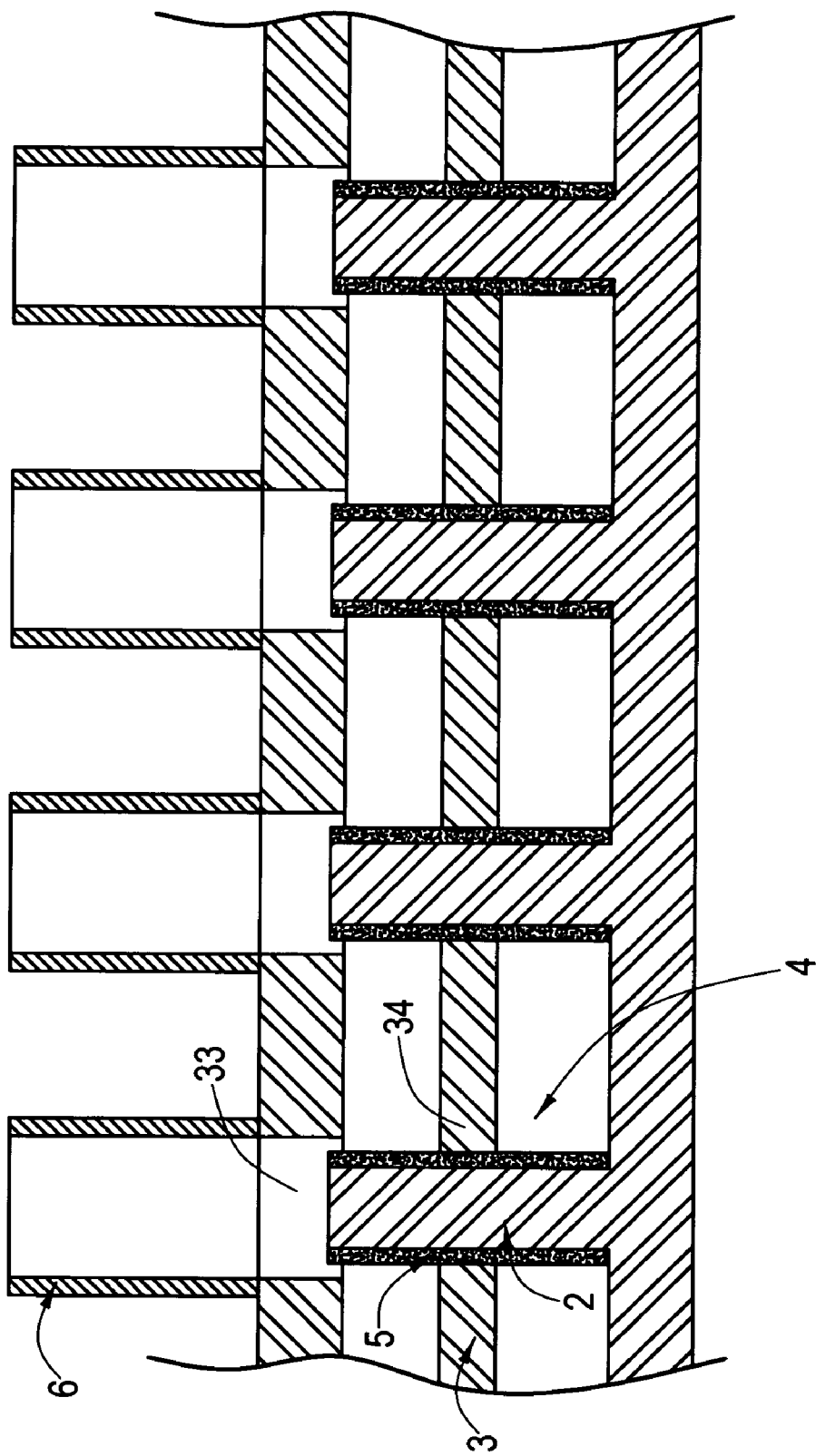
FIG. 7 shows how a seventh embodiment of the present invention works.

In the seventh embodiment of the present invention, as shown in FIG. 7, the structure as described above, a plurality of properly interspaced the anode 2 can be set on top of the base 1. The magnetic pole 3 also has a plurality of magnetic and conductive lateral section 34 set between each of the plurality of anodes 2. At least one orifice 33 is also set on the radiation path of each of the plurality of the anodes 2. Above each of the at least one orifice 33, there is also a constrictor 6 to ensure that each particle beam radiated by the each anode 2 maintains its irradiation angle after coming out of each of the orifices 33, reaching its intended target without difficulty.

It can be easily understood from the description of the above embodiments that the present invention possesses the following advantages when compared with its prior art counterparts:

1. Via using an insulation material 5 to insulate the anode 2 from the magnetic pole 3, thus only exposing the irradiation path and targeted aligning film to particle beams, the present invention can constrict plasma generation area to the minimum, and hence, prevent internal components of the device from deterioration, prolonging their service life and lowering maintenance cost.

2. The present invention can extend the constrictor 6 along the path of the particle beam to maintain the irradiation angle of the particle beam, ensuring that it reaches its intended target without sputtering around and damaging the service life of other components around, effectively prolonging their service life and lowering their maintenance cost.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An anode layer particle beam device, comprising:
   a base;
   a magnetic pole made of magnetic and conductive material and used as a cathode, wherein the magnetic pole is positioned on the base and includes an inner wall and an outer wall;
   an insulation layer formed on the base to be located between the inner wall and the outer wall;
   at least an anode made of metallic material, and formed on the insulation layer to be located between the inner and the outer wall so that an electric discharge channel is formed between the insulation layer and the inner and the outer walls of the magnetic pole, as well as between the anode and the inner and outer walls of the magnetic pole;
   an orifice set on a radiation path of the anode; and
   an insulating material placed in the electric discharge channel to serve as an insulator between the anode and the magnetic pole;
   thereby, a process gas can be put in the electric discharge channel and be applied with biased electric field so that with the anode and the magnetic pole, a particle beam is generated and radiated out from the orifice.

2. The anode layer particle beam device as in claim 1, wherein the anode is a continuous circular object.

3. The anode layer particle beam device as in claim 1, wherein the insulation material is made of Teflon or ceramic material.

4. The anode layer particle beam device as in claim 1, wherein the insulation material is coated on two side surfaces of the anode which respectively face the inner wall and the outer wall, and the electric discharge channel is formed between the insulation material and the inner and the outer walls of the magnetic pole.

5. The anode layer particle beam device as in claim 1, wherein the insulation material is coated on an inner end surface of the outer wall and an outer end surface of the inner wall and the electric discharge channel is formed between the insulation layer and the insulation material, as well as between the anode and the insulation material.

6. The anode layer particle beam device as in claim 1, wherein the insulation material is a shield or shelter placed in without entirely filled the electric discharge channel to insulate the anode from the magnetic pole.

7. The anode layer particle beam device as in claim 1, wherein the base is an oval or round shaped object.

8. The anode layer particle beam device as in claim 7, wherein the magnetic pole comprises two ovals built on the base and having the same center but with different radiuses, with one oval being the inner wall and another being the outer wall, each on one side of the anode.

9. The anode layer particle beam device as in claim 8, wherein the magnetic pole further includes an inner ceiling on top of the inner wall and an outer ceiling on top of the outer wall, and between the inner ceiling and the outer ceiling the orifice is formed.

10. The anode layer particle beam device as in claim 1, wherein the magnetic pole is positioned on a more elevated position than that of the anode and surrounding the center of anode.

11. The anode layer particle beam device as in claim 1, wherein the magnetic pole comprises two ovals built on the base and having the same center but with different radiuses, with one oval being the inner wall and another being the outer wall.

12. The anode layer particle beam device as in claim 11, wherein the magnetic pole further includes an inner ceiling on top of the inner wall and an outer ceiling on top of the outer wall, and between the inner ceiling and the outer ceiling the orifice is formed.

13. The anode layer particle beam device as in claim 1, further comprising a constrictor physically set above the orifice and around the radiation path of the anode to ensure that each particle beam radiated out of the orifice maintains an irradiation direction, reaching an intended target without difficulty.

14. The anode layer particle beam device as in claim 13, wherein the constrictor is made of reflective material to reflect ions.

15. The anode layer particle beam device as in claim 1, wherein a plurality of anodes are provided, with the magnetic pole having a plurality of magnetic and conductive lateral sections set between each of the plurality of anodes and the orifice is also set on the radiation path of each of the plurality of the anodes.

16. The anode layer particle beam device as in claim 2, further comprising a constrictor physically set above the orifice and around the radiation path of the anode to ensure that each particle beam radiated out of the orifice maintains an irradiation direction, reaching an intended target without difficulty.

17. The anode layer particle beam device as in claim 1, wherein the base plate is made of metallic material.

* * * * *